(12) United States Patent
Taylor et al.

(10) Patent No.: US 6,283,620 B1
(45) Date of Patent: Sep. 4, 2001

(54) LIGHT FOR AN INDIVIDUAL ENGAGED IN A SPORT ACTIVITY

(76) Inventors: James F. Taylor, 200 Moore Creek Rd., Santa Cruz, CA (US) 95060; Cary R. Croopnick, 1500 Cordilleras, San Carlos, CA (US) 94070

( * ) Notice: Subject to any disclaimer, the term of this patent is extended or adjusted under 35 U.S.C. 154(b) by 0 days.

(21) Appl. No.: 09/354,646

(22) Filed: Jul. 16, 1999

(51) Int. Cl.[7] .................................................... F21V 33/00
(52) U.S. Cl. .......................... 362/474; 362/396; 362/476; 362/184; 362/191; 362/105
(58) Field of Search ............................ 362/474, 190–191, 362/396, 184, 473–476, 105–106

(56) References Cited

U.S. PATENT DOCUMENTS 5,884,992 * 3/1999 Taylor et al. ............................ 362/72

* cited by examiner

Primary Examiner—Sandra O'Shea
Assistant Examiner—Ronald E. DelGizzi
(74) Attorney, Agent, or Firm—C. Michael Zimmerman

(57) ABSTRACT

A modular light arrangement is described which is useful for an individual engaged in a sport activity. It easily can be converted from a single to a dual light bulb housing arrangement while maintaining stability and rigidity. It includes a clamp positioned to grip one or more light housings between a pair of opposed jaws. A pair of spaced indexing pins is provided on one of the jaws and a corresponding pair of spaced indexing posts are provided on the other jaw. These pins and posts collectively engage complementary sockets in the housing(s) to facilitate the gripping. One of the jaws is movable toward and away from the other to facilitate changing the number of light housings that are gripped.

16 Claims, 4 Drawing Sheets

LIGHT FOR AN INDIVIDUAL ENGAGED IN A SPORT ACTIVITY

CROSS-REFERENCES TO RELATED APPLICATIONS

This patent application is related to U.S. Pat. No. 5,884,992 entitled MODULAR INDIVIDUAL LIGHTING SYSTEM FOR SPORTS ACTIVITIES and naming one of us as a coinventor, the disclosure of which is hereby incorporated herein.

BACKGROUND OF THE INVENTION

The present invention relates to a light for an individual engaged in a sport activity and, more particularly, to a modular lighting arrangement which provides a stable and rigid light source irrespective of whether a single or dual light bulb housing arrangement is utilized.

As discussed in the patent application identified above, individual lighting arrangements have been designed for certain participatory sport activities. Such lighting arrangements are available, for example, for mountain biking participants. These arrangements typically include one or two actual light bulbs contained in one or more housings mountable via an intermediary receiver and an appropriate mount to, for example, a rider's helmet (for mountain biking) or the handlebars of the bicycle. These lights typically also include a power source, such as a battery pack, which is carried, for example, in a back or fanny pack by the rider or within the bicycle's mounting structure for a water bottle. A power cord or the like extends from the power source to light bulb(s) within the housing(s) to deliver the necessary electrical power to the light bulbs.

In most lights of this type, if one purchases one having a single light bulb and then wishes to upgrade to a dual light bulb arrangement, the full arrangement or, at least, the single light bulb housing has to be replaced. The invention described in the patent application referred to above focuses on this issue by providing a modular arrangement that is convertible from a single light bulb one to a dual light bulb one.

SUMMARY OF THE INVENTION

The present invention is a modular light of the type described in the earlier patent, which invention assures that the light housing(s) is/are rigidly gripped and stably pointed. In its basic aspects the invention includes a clamp which is positioned to grip one or more light housings between a pair of facing opposed jaws and point the resulting light beam stably toward an area to be illuminated. Desirably, at least one of the jaws is movable toward and away from the other to facilitate changing the number of light housings that are gripped. Moreover, at least one of these jaws preferably has a pair of spaced indexing pins which selectively engage complementary sockets in the housing to facilitate such gripping and stable pointing. The other jaw most desirably includes a pair of spaced indexing posts which are opposed to the pins and similarly engage a pair of complementary sockets in the housing. The spacing between the two pins and the two posts is selected such that the pins and posts alternatively can engage opposed sockets on one housing or opposed sockets on a pair of housings.

Other features and advantages of the invention either will become apparent or will be described in connection with the following, more detailed description of the invention and variations.

BRIEF DESCRIPTION OF THE DRAWING

With reference to the accompanying drawing.

DETAILED DESCRIPTION OF THE PREFERRED EMBODIMENTS

The following, relatively detailed description is provided to satisfy the patent statutes. It will be appreciated by those skilled in the art, though, that various changes and modifications can be made without departing from the invention.

Figure 1:
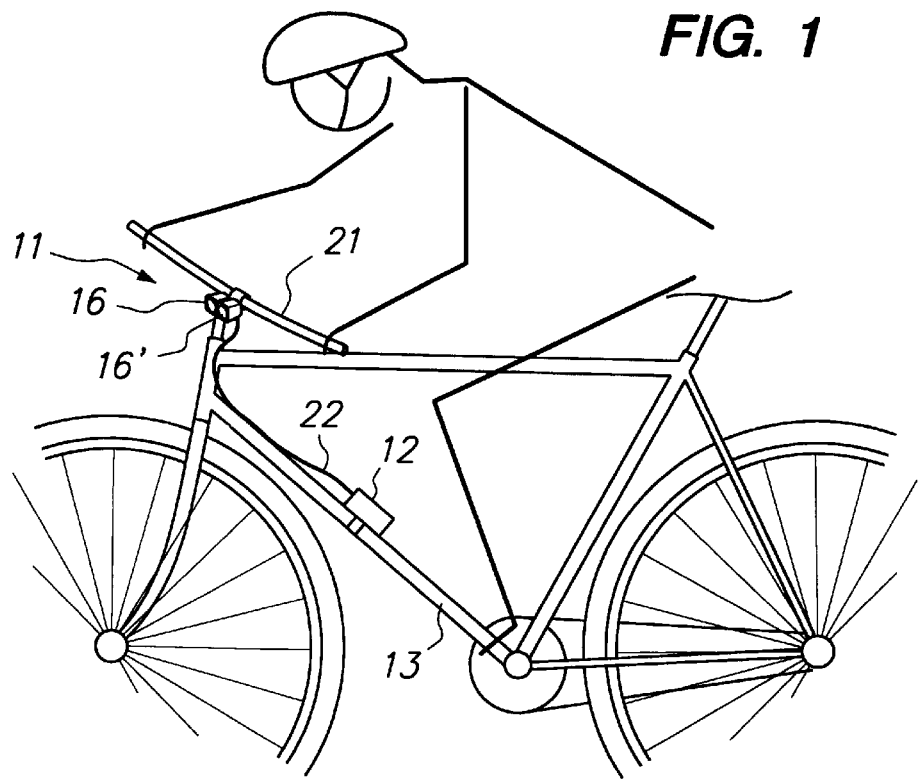
FIG. 1 is a schematic, stick figure type showing of a portion of a bicycle with a rider and a first preferred embodiment of the present invention.

A first preferred embodiment of the invention is illustrated in FIG. 1, combined with a typical mountain bike and rider (both shown schematically and partially). The lighting arrangement is generally referred to by the reference numeral 11. Such light includes a source of electrical power, e.g., a battery pack 12 held on frame bar 13 of the bicycle. The battery pack simply can be a number (5, 7, or 11 are typical) of C-type NiCd or NiMH batteries which are secured together via, for example, shrink wrapping.

A light source provided by housing 16 and housing 16' respectively for light bulbs, are mounted parallel to one another by a clamp 18 (FIGS. 3 and 4) and handlebar mount 19 to handlebars 21 of the bicycle to provide an illuminating light beam. A power cord 22 is illustrated delivering power from the battery pack 12 to the light source. In this connection, cord 22 includes plug connectors which mate with complementary sockets provided in housings 16 and 16' (see the earlier patent). It should be noted that the power is not directly delivered to the bulb in each housing, but by a typical arrangement within the housing which provides interaction between the bulbs and such cord.

The preferred embodiments are modular arrangements. A major aspect of the first preferred embodiment relates to the light bulb housings 16 and 16'. They are identical and one, housing 16, is illustrated in some detail in FIGS. 3 and 4. This housing has an exterior configuration which is attractive and yet enables the same to be selectively attached to housing 16' for another light bulb. It includes a female cavity 24 (FIG. 5) which interacts with an insert 26 which fills the same.

Figure 5:
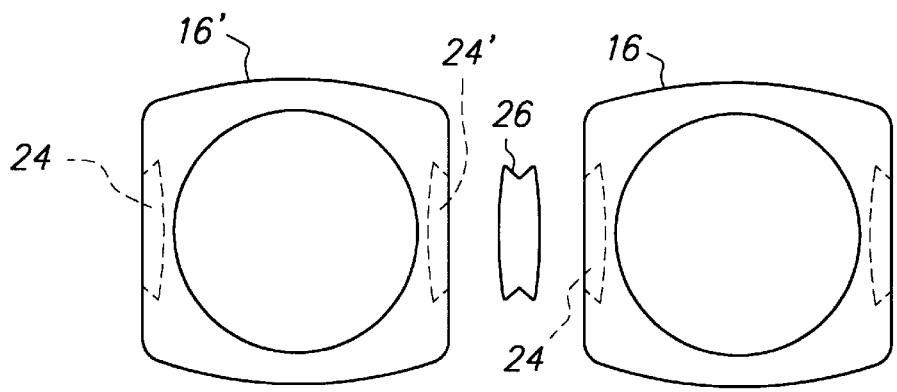
FIG. 5 is an exploded somewhat schematic view of a pair of light bulb housings of a light of the invention and an insert for the same.

As can be seen best from FIG. 5, the insert 26 is designed to project outward beyond the housing 16. When the light of the invention is used in an arrangement having a single light bulb housing, the insert 26 adds to the attractiveness of the unit. In this connection, its shape generally conforms to the curvature incorporated into the housing. When the light of the invention is used in an arrangement having two light bulbs, housings, the insert 26 secures the housings together at its location and acts as one point of a triangular, three-point securance connection. (The other two points will be identified below.)

Figure 3:
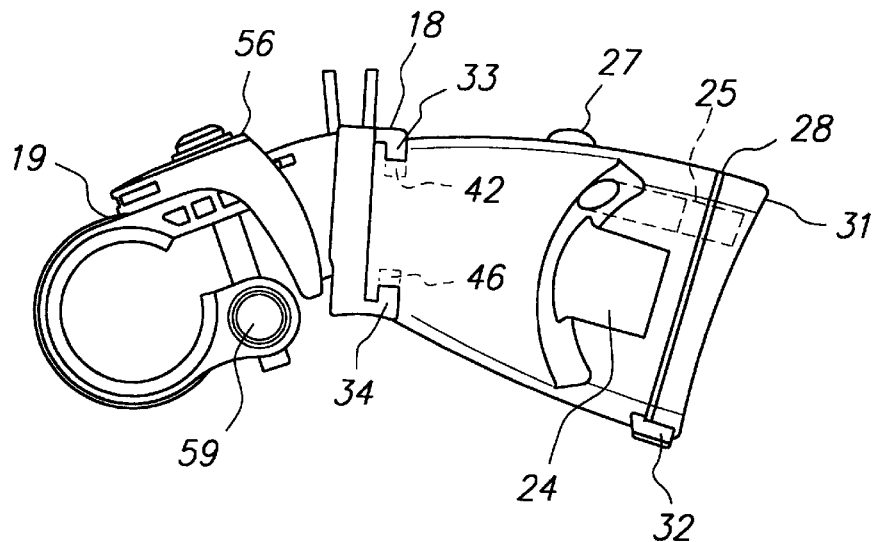
FIG. 3 is a side elevation view of the first preferred embodiment of the invention.
Figure 4:
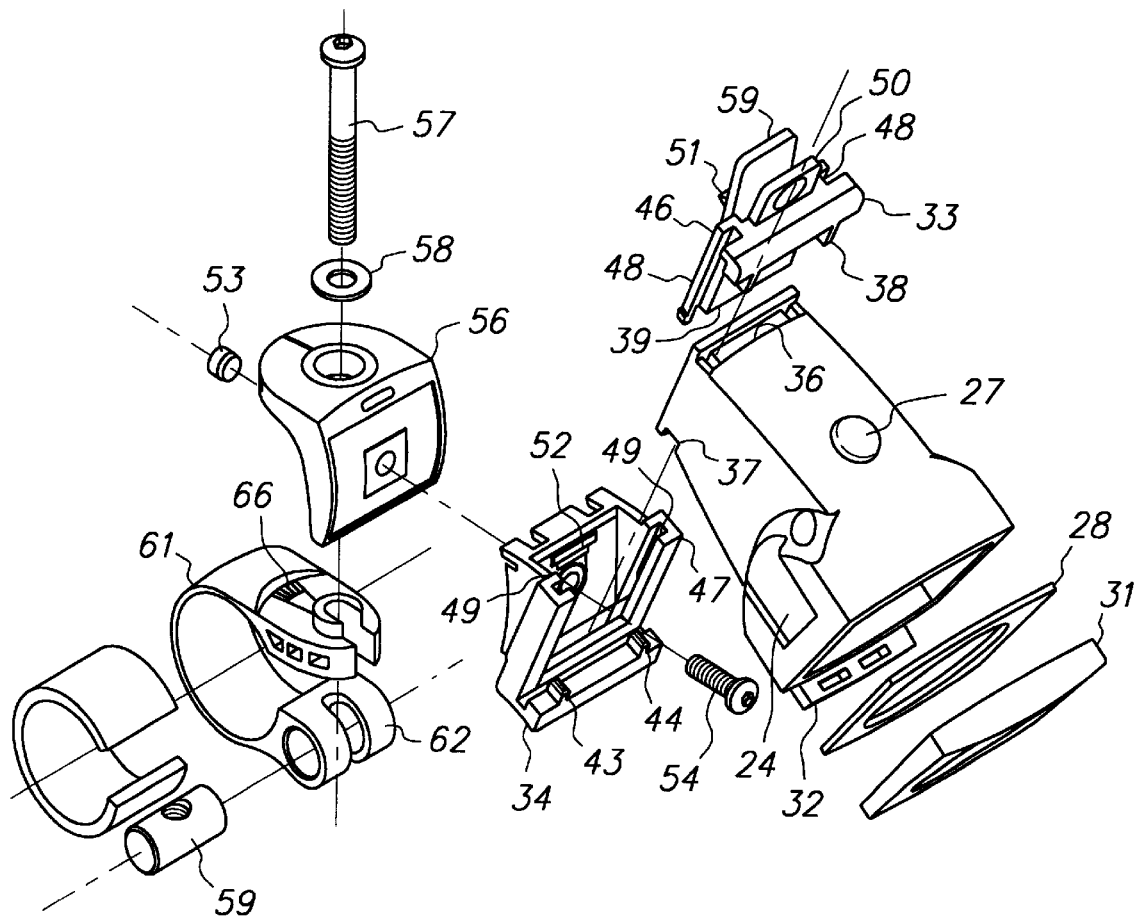
FIG. 4 is an exploded, isometric view of such first preferred embodiment.

Housing 16 is symmetrical, i.e., the side of the housing opposed to that side shown in FIGS. 3 and 4 is identical to that shown. A push-button 27 for activating the light bulb is also included at the top of the housing. A pair of Phillips head screws 25 (only shown in FIG. 3 and only one being on the side shown) extend through each of the housings, through a gasket 28 which maintains the light bulb and its casing in place, and into the upper portion of a bezel 31 for such housing. The lower portion of each bezel is held in position on its associated housing by a standard slot and tab arrangement partially provided by a flange 32.

The clamp 18 grips the housing between a pair of opposed jaws 33 and 34. In this connection, the end of the housing opposite the end from which light is to issue includes a pair of opposed slots 36 and 37 for receiving such jaws.

Jaws 33 and 34 provide a rigid grip on the end of the housing with which they are associated. As illustrated, jaw 33 includes spaced indexing pins 38 and 39 which fit respectively into complementary sockets 41 and 42 in the housing slot 36 when the jaw 33 is within such slot.

Jaw 34 includes a pair of spaced indexing posts 43 and 44 which similarly fit into complementary sockets 46 (only one of which is shown) in the housing when the jaw 34 is in the slot 37.

The pins 38, 39 and the posts 43, 44 enhance the grip provided by the clamp.

The jaws 33 and 34 are movable with respect to one another. This is best shown in the exploded view of FIG. 4 from which it can be seen that the clamp 18 is made of two parts, an upper part 46 and a lower part 47. The lower part 47 is stationary with respect to the mount 19, whereas the upper part is movable with respect to such mount. In this connection, the upper part includes a pair of projecting runners 48 which slide within a pair of complementary channels 49 in the part 47. A pair of pinch tabs 50 are included, with one being integral with the body of the upper part and the other controlling the position of a placement tab 51. When the upper and lower parts are in proper position with the jaws and their associated pins and posts, respectively, engaging with a light housing, the tab 51 engages within a slot 52 of the lower part, thus locking the upper and lower parts in position with the opposed, facing jaws gripping the associated housing(s).

It is the lower part 47 of the clamp that is fixed to the mount 19. That is, it is tightly secured via a threaded insert 53 and a bolt 54 to an intermediate mount receiver 56. Such receiver is, in turn, connected via a machine screw 57, a washer 58 and a solid cylindrical nut 59 to a handlebar collar 61. In this connection, the cylinder nut 59 fits within a slotted nut collar portion 62. The fact that collar portion 62 is slotted enables an installer to rotate the collar relative to the handlebars to move the light vertically somewhat for aiming. An inner collar 63 is also provided to facilitate securance to the handlebars of a bicycle. The provision of such an inner collar helps prevent the mount 56 from premature releasing seen because of a heavy load.

Figure 6:
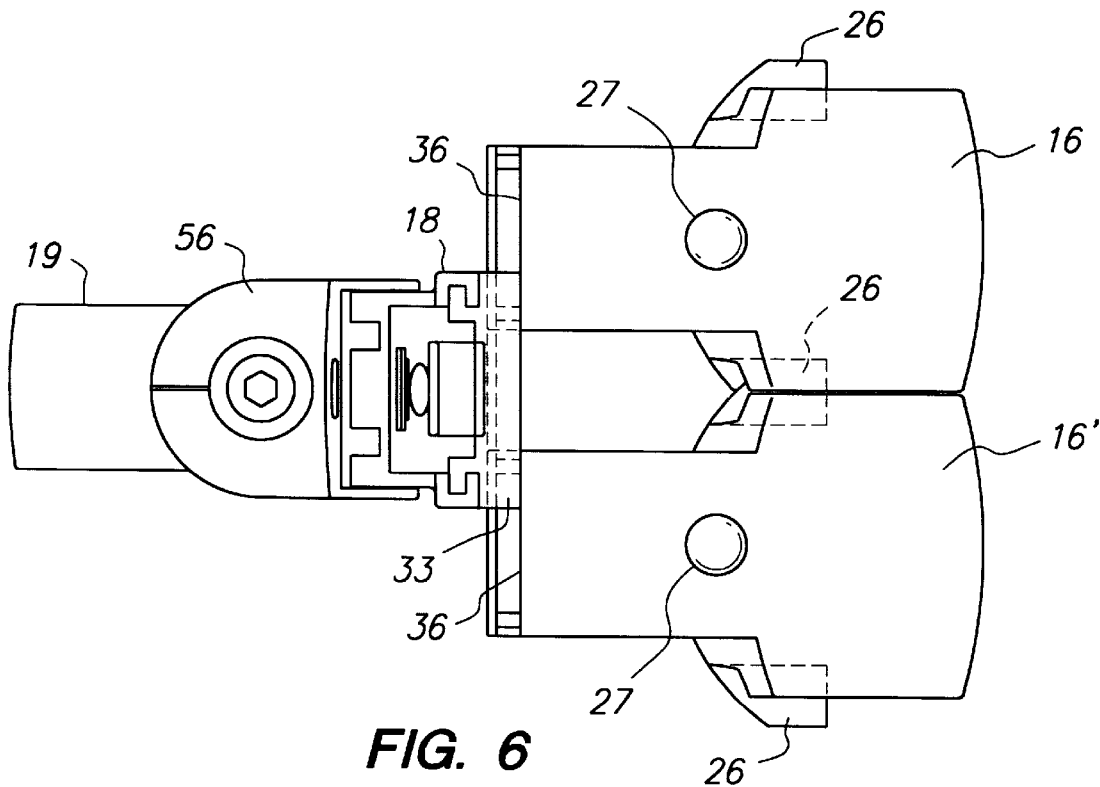
FIG. 6 is a top plan view of a pair of light housings interacting with a single clamp and mount of the first preferred embodiment of the invention.

As mentioned previously, the invention is a modular light arrangement in which more than one housing can be gripped by the single clamp. FIG. 6 illustrates this in some detail. Two housings 16 and 16' are secured together with a single insert 26 and a single clamp 18. In this connection, the jaws 33 and 34 (only jaw 33 being shown in FIG. 6) fit within the-slots 36 of both of the housings with the indexing pins and posts engaging the end sockets in each. In this connection, the spacing between the pins and the spacing between the posts are selected to correspond to the spacing between the sockets on a single housing as well as the spacing between the two end sockets on two housings to hold the same in proper position parallel to one another.

As also mentioned previously, there is a three-point triangular connection when there are two housings and only one clamp. The connection between the two housings provided by the insert 26 provides one of these three points and the pin and post connections provided on the respective housings provide the other two. (There are actually five [two triangles] when the housing tops and bottoms are considered together.) This spaced connection adds to the stability of the arrangement.

Figure 7:
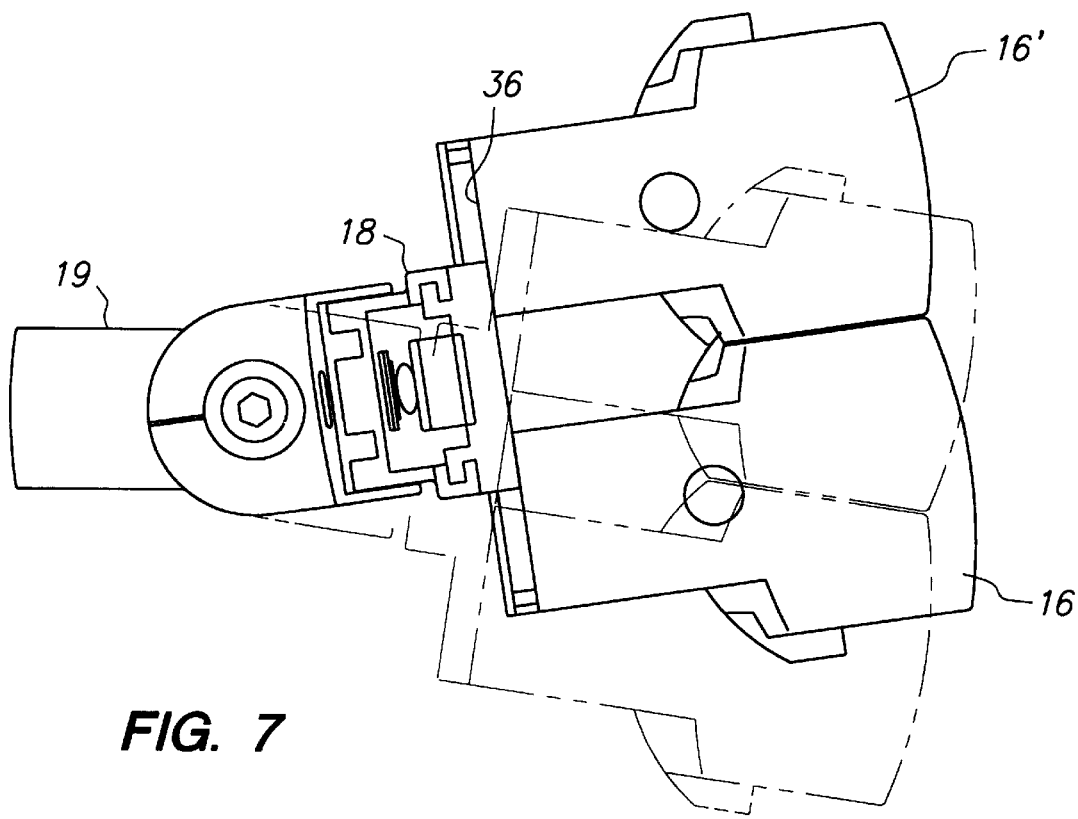
FIG. 7 is a view similar to FIG. 6 showing the manner in which the mount provided for such embodiment allows limited adjustment of position about a generally vertical axis.

The construction enables limited horizontal adjustment about a generally vertical axis, of the positioning of the two housings without interfering with the rigid grip provided by the clamp. In this connection, as is shown in FIG. 4 the upper surface of the collar 61 includes gearing teeth 66 which interact in a common fashion with similar gearing teeth (not shown) on the bottom of the receiver 56 to hold the mount in an adjusted position. To adjust the position, one need only loosen bolt 57, move the light housing(s) to a desired position and then tighten bolt 57 again. FIG. 7 shows the extent of adjustment with the construction shown with one of the extreme positions being shown in solid lines and the other being shown with phantom lines.

Figure 2:
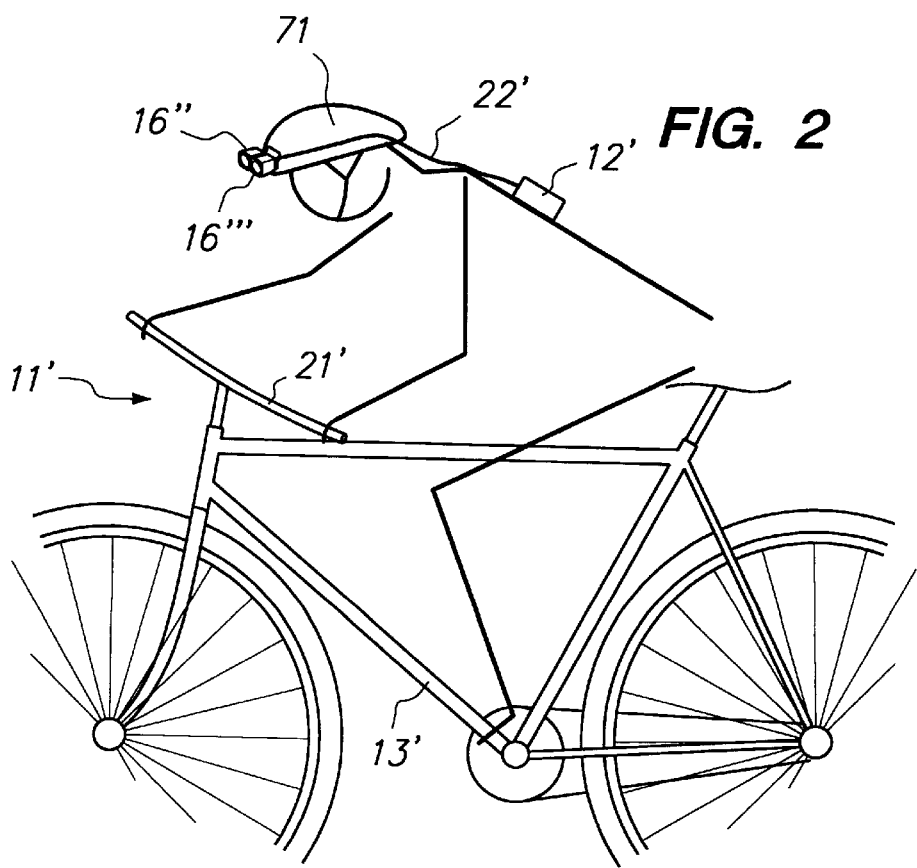
FIG. 2 is a schematic, stick-figure type showing similar to FIG. 1 showing an alternate preferred embodiment of the present invention.
Figure 8:
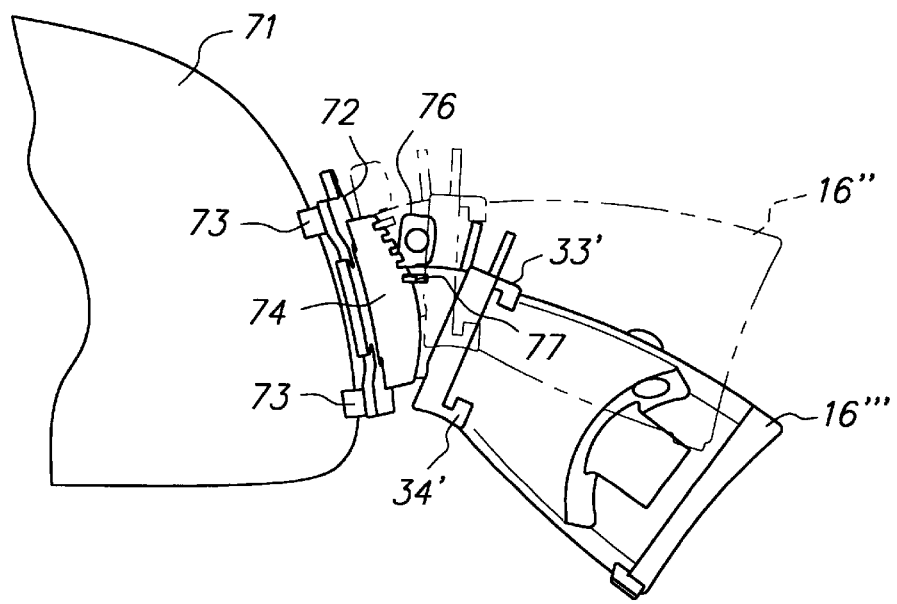
FIG. 8 is a side elevation view of the alternate embodiment showing how the mount enables limited vertical adjustment about a generally horizontal axis.

An alternate preferred embodiment of the invention is illustrated in FIGS. 2 and 8. This embodiment differs from the earlier described embodiment only in the manner in which it is secured for a rider. In this connection, like parts are referred to by like primed reference numerals.

Instead of mounting on the handlebars of a bicycle, the embodiment of FIGS. 2 and 8 is mounted on the helmet 71 of a rider and the batteries 12' are mounted on the rider's back. The manner in which the jaws 33' and 34' with their associated indexing pins and indexing posts interact with the housings 16" and 16'" is the same as the manner described earlier in which the jaws 33 and 34 interact with the housings 16 and 16'. The only meaningful differences between the embodiments is the manner in which they are mounted. The helmet mount includes a base plate 72 which is rigidly secured in position to the helmet 71 via a pair of horizontally spaced adhesive bars 83. The plate 72 supports a pair of vertical side rails 74 which are spaced apart and are at the respective side edges of plate 72 (only one of the side rails is shown in FIG. 8). As illustrated, the upper end of each of the rails 74 is serrated with notches which define adjusted positions for the light housings. In this connection, a pair of pinch tabs 76 are provided (only the one which interacts with the shown side rail 74 is illustrated in FIG. 8). Each of these pinch tabs includes a protuberance 77 which protrudes outwardly of its associated pinch tab and is urged by such pinch tab into engagement with a notch in the side rail. In this connection, the pinch tabs are somewhat flexible and are mounted to normally urge and maintain the protuberances 77 engaged within opposite notches in the two side rails.

It will be seen that with such construction it is only necessary for a user to pinch the two pinch tabs toward one another to disengage the associated protuberances from a pair of notches and move the light housings to a different vertical position.

Although the invention is described in connection with the conversion of a single light bulb arrangement to a dual light bulb arrangement, it will be recognized that from the broad standpoint the invention is also applicable to an arrangement in which there will be three (or more) light bulb housings. While a three light housings arrangement may be unusual, it is usable in some situations, e.g., by a security force with one of the lenses being red. The invention can provide the same. One way is simply to use two clamps on opposed sides of a center housing to interact with side light housings. If enough room is available for two clamps and mounts, a clamp can be provided for each of the end units with the central unit being "squeezed" between the two.

As mentioned at the beginning of the detailed description, applicant is not limited to the specific embodiments and variations described above. They are exemplary, rather than exhaustive. And although the invention is being described in connection with mountain biking embodiments, it is useful for other sports activities, such as cross country skiing. The claims, their equivalents and their equivalent language define the scope of protection.

What is claimed is:

1. In a light designed for an individual engaged in a sport activity, the combination comprising:
   A. A first housing for a light bulb to provide illumination to create a light beam, said housing having an end from which said light beam is to project;
   B. a clamp having a pair of facing opposed jaws configured to grip said housing between them and point said light beam stably toward an area to be illuminated, at least one of said pair of facing opposed jaws being movable relative to the other toward and away from the other; and
   C. a mount for securing said clamp and a first housing held thereby to an implement of the sports activity.

2. The light of claim 1 wherein said first housing defines an exterior female cavity to hold an insert configured to project outward beyond said housing.

3. The light of claim 1 further including a second housing for a light bulb to provide illumination to create a second light beam, said second housing also having an end from which said second light beam is to be projected; said insert that projects beyond the first housing also being configured to interact with said second housing to rigidly attach said first and second housings together at its location, and said clamp being configured to selectively grip both of said light housings with said pair of facing opposed jaws.

4. The light of claim 1 wherein at least one of said facing jaws is movable toward and away from the other; and at least one of said jaws has a pair of spaced indexing pins which selectively engage complementary sockets on said housing upon said jaw movement, to facilitate said gripping and stable pointing of said light beam.

5. The light of claim 4 wherein said clamp further includes a pair of spaced posts which are opposed to said indexing pins and similarly engaged a pair of complementary sockets in said housing to cooperate with said indexing pins to provide said gripping and pointing.

6. The light of claim 4 wherein spacing between said indexing pins is selected both to engage complementary sockets on said housing individually or and to engage one or more complementary sockets simultaneously on a pair of said housings.

7. The light of claim 6 wherein said clamp further includes a pair of spaced projections which are opposed to said indexing pins and similarly engage a pair of complementary sockets in said housing, the spacing between said posts being selected both to engage complementary sockets on said housing individually and to engage complementary sockets simultaneously on a pair of said housings.

8. The light of claim 1 wherein said mount is configured for rigidly securing said clamp and light bulb housing held thereby, to a helmet worn by an individual engaged in a sports activity.

9. The light of claim 8 wherein said combination is configured for said clamp and first housing held thereby to be adjustable generally vertically to a limited extent relative to the normal positioning of said helmet.

10. The light of claim 1 wherein said mount is configured for rigidly securing said clamp and light bulb housing held thereby, to the handlebars of a bicycle of an individual engaged in a sports activity.

11. The light of claim 10 wherein said combination is configured for said clamp and first housing held thereby to be adjustable generally horizontally to a limited extent relative to the normal positioning of said handlebars.

12. In a light designed for an individual engaged in a sport activity, the combination comprising:
    A. first and second housings for light bulbs to provide illumination for creating a light beam, said housings being generally parallel to one another and each having an end adjacent the end of the other from which the light provided by the same is to project to form said light beam;
    B. a clamp having a pair of facing opposed jaws configured to grip said first and second housing between them simultaneously and point said light beam stably toward an area to be illuminated, at least one of said pair of facing opposed jaws being movable relative to the other toward and away from each other; and
    C. a mount for securing said clamp and said first and second housings held thereby to an implement of the sports activity.

13. The light of claim 12 wherein each of said first and second housings define an exterior female cavity configured to hold an insert which rigidly attaches said first and second housings together at the insert's location.

14. The light of claim 13 wherein at least one of said pair of jaws includes a pair of spaced indexing pins which engage complementary sockets on said first and second housings and the other of said pair of jaws includes a pair of spaced posts which are opposed to said indexing pins and similarly engage a pair of complementary sockets in said housings to cooperate with said indexing pins to provide said gripping and pointing.

15. The light of claim 14 wherein the spacings between the indexing pins of said pair of indexing pins and between the posts of said pair of posts are selected both to engage complementary sockets on said housings individually and to engage complementary sockets simultaneously on both of said housings.

16. The light of claim 9 wherein said mount includes a base plate to be rigidly secured in position to a helmet, and one of said clamp and base plate includes notches for interacting with the other of said clamp and base plate to define adjusted positions for said first housing.

* * * * *